United States Patent
Chadenson

[15] 3,690,184
[45] Sept. 12, 1972

[54] APPARATUS FOR STATICALLY MEASURING THE AVERAGE DENSITY OF A LIQUID CIRCULATING IN A PIPELINE

[72] Inventor: Pierre Chadenson, La Tronche, France

[73] Assignee: Societe Generale De Constructions Electriques Et Mechaniques (Alsthom), Grenoble, France

[22] Filed: June 24, 1970

[21] Appl. No.: 48,973

[30] Foreign Application Priority Data

June 27, 1969 France...................6921897

[52] U.S. Cl. .................................................73/438
[51] Int. Cl. ..............................................G01n 9/26
[58] Field of Search.................73/32, 438, 451–454, 73/403, 406–410, 299

[56] References Cited

UNITED STATES PATENTS

| 3,190,126 | 6/1965 | Wright | 73/438 |
| 35,152 | 5/1862 | Hogg | 73/438 |

FOREIGN PATENTS OR APPLICATIONS

| 89,436 | 6/1937 | Sweden | 73/451 |
| 905,228 | 9/1962 | Great Britain | 73/299 |
| 157,829 | 1/1962 | U.S.S.R. | 73/438 |
| 171,652 | 2/1964 | U.S.S.R. | 73/438 |

*Primary Examiner*—Richard C. Queisser
*Assistant Examiner*—C. E. Snee, III
*Attorney*—Sylvester J. Liddy, John J. Hart, Joe E. Daniels and Charles E. Baxley

[57] ABSTRACT

The apparatus comprises a first column in which a certain flow extracted from the pipeline circulates, and a second column containing a predetermined quantity of calibrating liquid, the second column being fitted at its base with a horizontal diaphragm whose outer face is subjected to the pressure of the liquid in the first column. An elongated vertically disposed float extends down in the second column almost to its base and is connected at its upper end to a control device forming part of a unit for maintaining the diaphragm in its horizontal position by regulating the height of the liquid in the first column so that the hydrostatic thrusts on both surfaces of the diaphragm are equal. The average density of the liquid is determined by measuring the height of the liquid in the first column from the horizontal position of the diaphragm.

18 Claims, 6 Drawing Figures

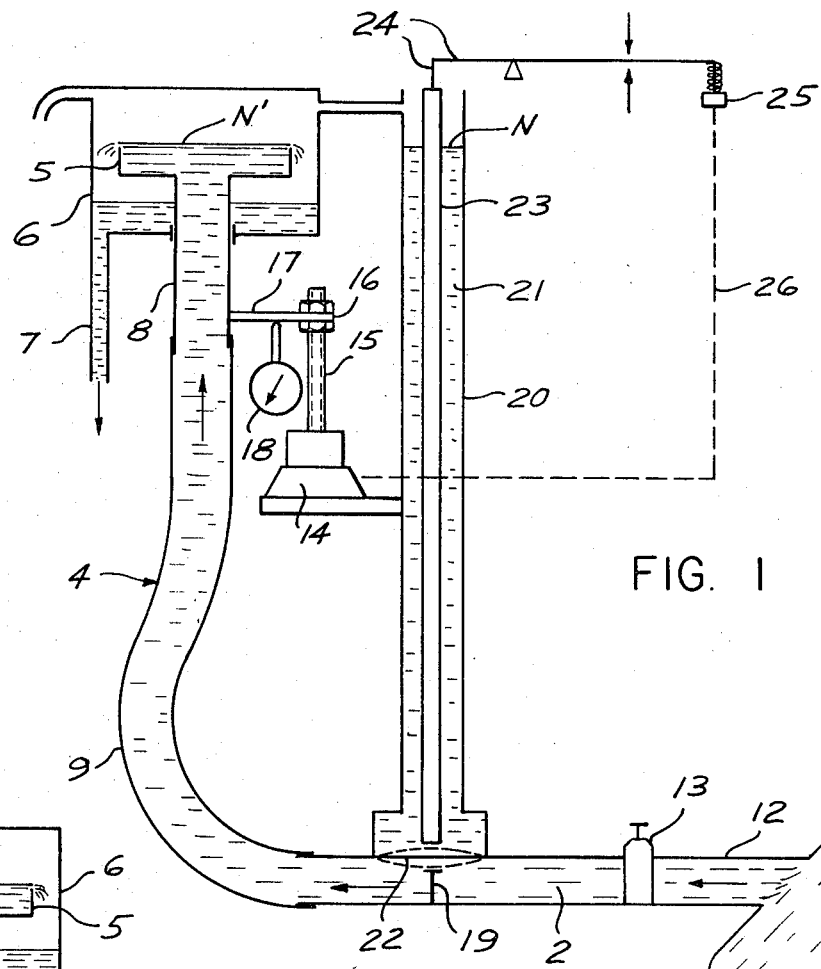
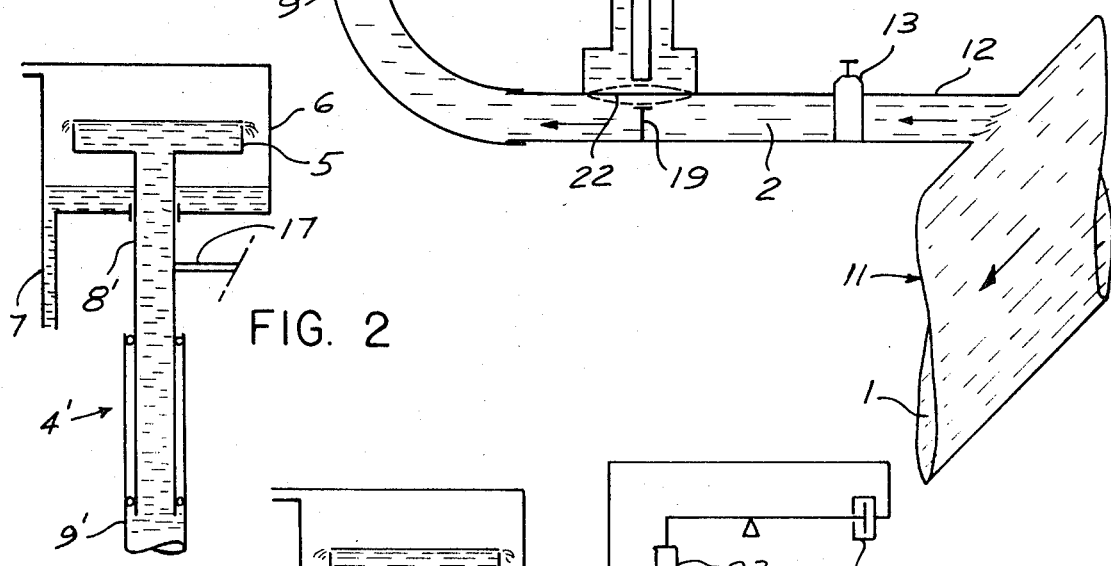
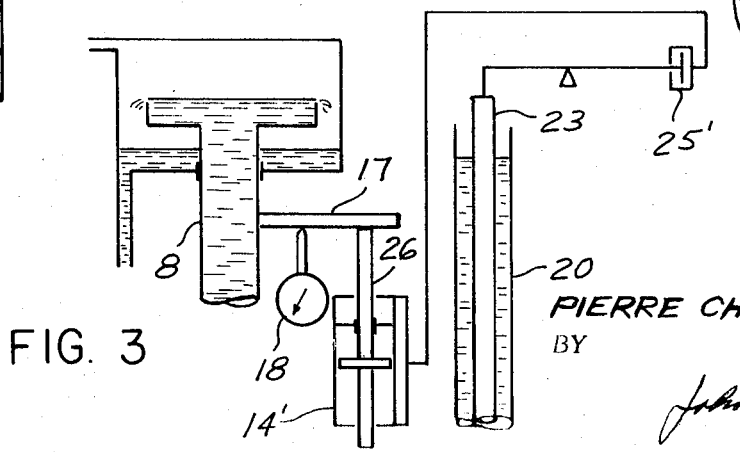
FIG. 1
FIG. 2
FIG. 3
INVENTOR.
PIERRE CHADENSON

APPARATUS FOR STATICALLY MEASURING THE AVERAGE DENSITY OF A LIQUID CIRCULATING IN A PIPELINE

This invention relates to apparatus for measuring the average density of a liquid circulating in a pipeline, for example, oil transported in a commercial pipeline.

The primary purpose of the invention is to provide an improved procedure for obtaining the static measurement of the average density of a liquid circulating in a pipeline.

In accomplishing such purpose in accordance with the invention, a certain flow extracted from the pipeline is caused to circulate through a first column. A second column containing a predetermined quantity of a reference liquid, is fitted with a diaphragm, the outer surface of which is parallel to the extracted liquid flow and on which the pressure of the liquid in the first column is exerted. A float is steeped in the second column down to the bottom area of the latter and is connected at its top to the control device of a unit which will regulate the height of the liquid in the first column at a level such that the hydrostatic thrust on both sides of the diaphragm are in equilibrium and the diaphragm is maintained parallel to the extracted liquid flow, i.e., a horizontal position. The average density of the liquid is therefore deduced from the height of the liquid in the first column, measured from the horizontal plane passing through the said diaphragm. It will be observed that in such a lay-out, at the moment that the pressures on the diaphragm are in equilibrium, the ratio between the height of the liquids in the two columns is inversely proportional to the density of the two liquids, so long as the condition prevails that the flow drawn off into the first column from the pipeline does not circulate at a speed greater than 0.2 m/sec. so that it shall not influence the height of the liquid in the first column. The height of the liquid in the second column being known, as well as its density, the measurement of the height of the first column allows the density of the liquid in this column to be calculated. If the length of the float in the second column is practically equal to the height of the column of reference liquid in which it is placed, the effect of the temperature of the reference liquid on the position of the said float is nullified, since variations of thrust on the float result, on the one hand, from variation in the level of the liquid and, on the other hand, from the variation in density of the said liquid which is compensated for.

For a better understanding of the invention, reference is made to the following specification which describes by way of example several methods of practicing the invention, and which should be read in connection with the accompanying drawings, in which:

FIG. 1 is a schematic elevational drawing of an arrangement in which the regulating means controls an electric motor to regulate the height of the liquid in the first column;

FIG. 2 is a schematic view showing the manner in which the upper end of the first column may be adjusted when it is made of rigid construction;

FIG. 3 is a schematic view illustrating how a servomotor may be used in place of the electric motor shown in FIG. 1;

Figure 4:
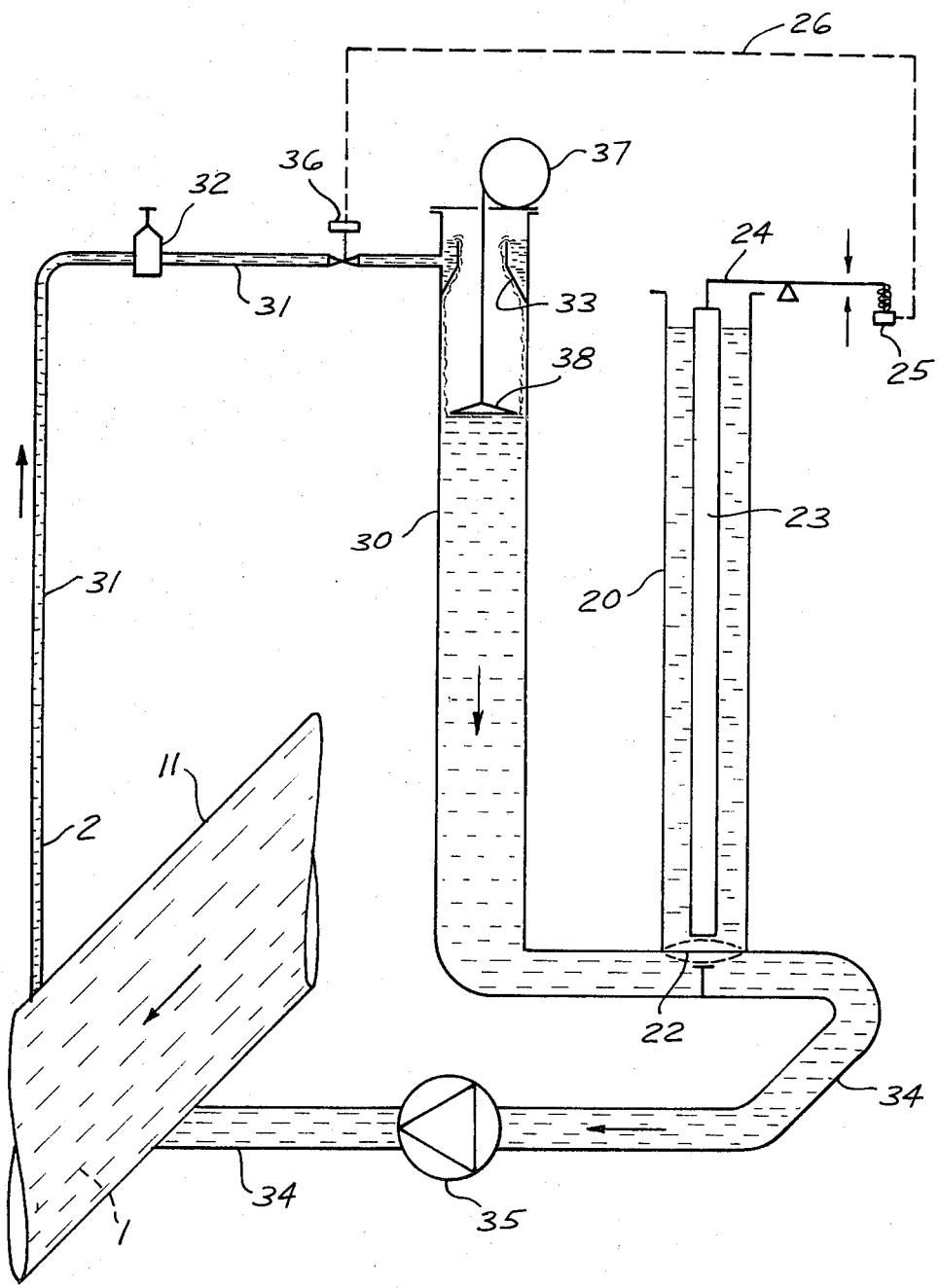
FIG. 4 is a schematic view of an arrangement in which the regulating means controls the flow of the extracted liquid to regulate the height of the liquid in the first column.
Figure 5:
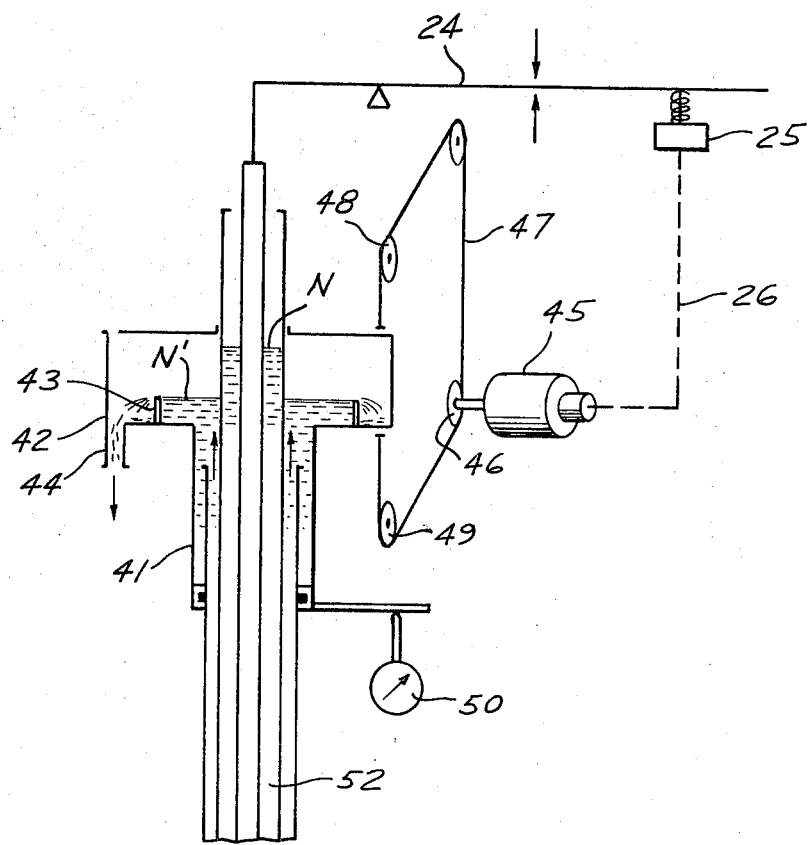
Figure 5:
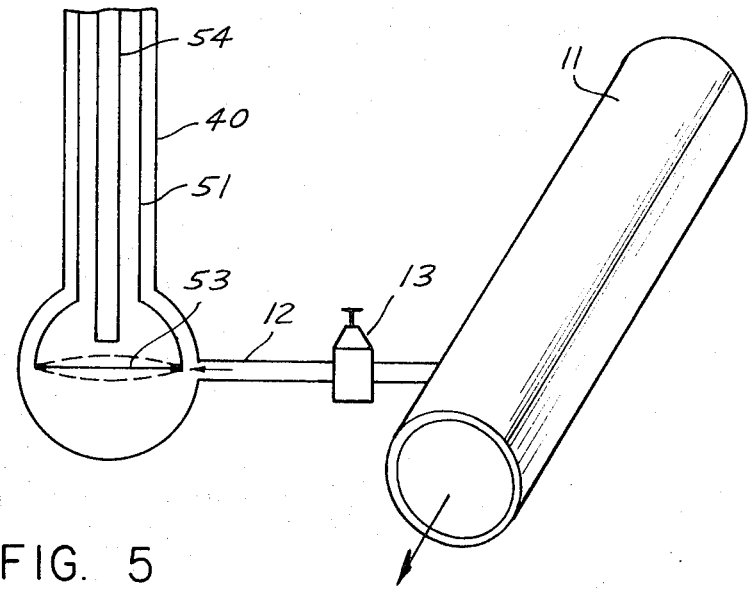
Figure 6:
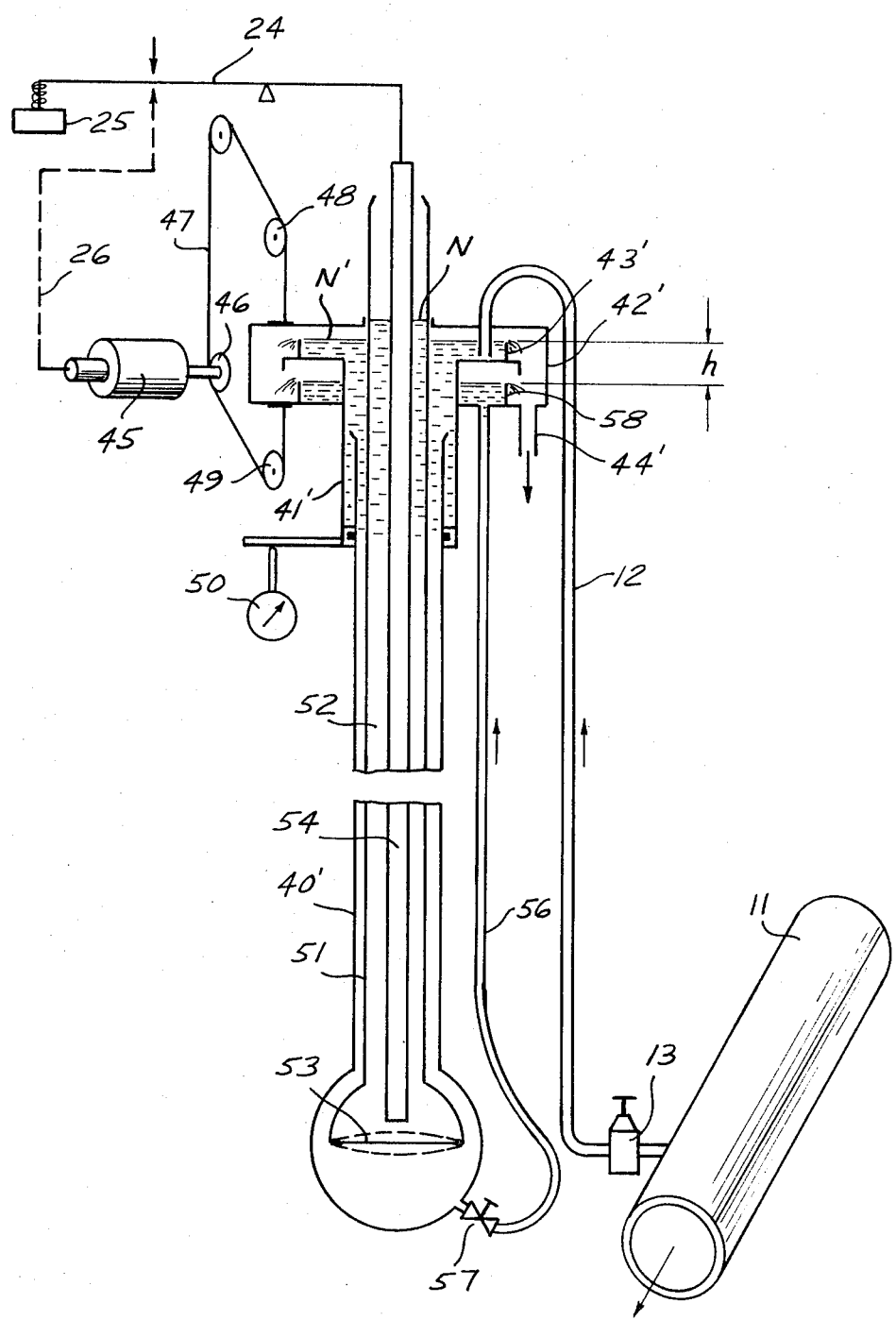

FIG. 5 is a schematic view of an arrangement in which the first and second columns are arranged concentrically, with the first column adjustable somewhat in the manner of FIG. 2; and FIG. 6 is a schematic view of an arrangement in which the first and second columns are concentrically arranged, and in which the flow of the extracted liquid is controlled to regulate the height of the liquid in the first column as in the modification shown in FIG. 4.

Referring now more particularly to FIG. 1 of the drawings, the reference numeral 11 designates generally a section of a pipe for liquids, such as a pipeline used for the transport of hydrocarbons 1 whose density is required to be known at all times. A small flow sample 2 is extracted from the liquid 1 in pipeline 11 into a rigid pipe 12 through a pressure reducing valve 13. The flow 2 is fed into the base of a first column generally designated 4 and including at its top a spillway 5 from which the liquid overflows into a tank 6. The liquid may either be discharged from the tank 6 as waste, or led therefrom by a duct 7 back into the pipeline 11. The spillway 5 has a vertical rigid section 8 which slidably extends through the bottom of tank 6 and which is connected to the upper end of a flexible section 9 of column 4 that is connected at its lower end to the downstream end of pipe 12. Column 4, therefore, may be adjusted to vary its height. This is accomplished by an electric motor 14 which operates a screw 15 to move a jack 16 built into the column 4 through a support 17 to which is fitted a dial gauge 18 showing the height of the column.

A second column 20, containing a suitable known calibrating liquid 21 at a predetermined height, corresponding to level N, is in pressure connection, with the base of column 4 through a diaphragm 22 fitted into the base of such column 20. As indicated in dotted outline, the diaphragm 22 will change shape in an upward or downward direction dependent on the difference in hydrostatic pressures exerted thereon by the liquids in columns 4 and 20. A stop 19 in the portion of pipe 12 underlying column 20, limits the downward movements of the diaphragm 22. Immersed in the liquid 21 of column 20 is an elongated float 23 which extends nearly to the bottom of such column. At its exposed top, the float 23 is connected by a system of levers 24,24 to a control device 25, which, through a suitable electrical connection 26, governs the rotation of the motor 14 and a screw 15 to effect the adjustment of the height of column 4. Float 23 is set in a balanced position, that is to say, it will not cause motor 14 to rotate to adjust column 4 when the position of the diaphragm 22 is horizontal, corresponding to an equilibrium between the pressure of the liquid circulating in column 4 (acting on one side of the diaphragm) and the pressure of liquid of the calibrating column 20 (acting on the other side). When this condition exists, the hydrostatic thrusts in these two columns will therefore be equal. When however, there is a difference in pressure exerted on the surfaces of the diaphragm 22, corresponding to a change in density of the liquid circulating in column 4, the diaphragm 22 changes shape, as shown by the dotted line, so modifying the level in column 20 and changing the height of the float 23.

When the float changes its position, it activates the levers 24 coupling it to the regulating device 25 which in turn causes a rotation of the motor 14 in a direction such that the height of column 4 is changed until the diaphragm 22 again becomes horizontal because its hydrostatic thrust is again equal to that of the calibrating column 20. At that precise moment the ratio of the heights of the columns is inversely proportional to the densities of the liquids. The height of the liquid 21 in column 20, being defined by its level N, and the density of the calibrating liquid 21 used being known, the density of the liquid in column 4 may be determined by measuring the height of column 4 from the horizontal plane passing through diaphragm 22 to the level N' set by the spillway 5. This measurement is taken from the reading given on the dial gauge 18. The flow drawn into column 4 circulates at a speed of 0.1 m/sec. and the spillway 5 is constructed to be sufficient length to ensure that the thickness of the overspill wave is minimal, so that any error arising from variations in the thickness of the overspill will be reduced.

The construction of the first column shown in FIG. 2 of the drawings differs from that of the first column in FIG. 1 in that the section 9' of column 4' is made rigid instead of flexible. The stem section 8' of the spillway or overflow 5 therefore, is slidably fitted in the upper end of the section 9' as well as with respect to the bottom of tank 6 so that the height of column 4' may be changed by the motor 14 in FIG. 1 connected to the support 17.

The construction shown in FIG. 3, differs from that of FIG. 1 in that the electric motor 14 of FIG. 1 has been replaced by a servo-motor 14' fitted with a piston whose shaft 26 is directly connected to and causes the adjusting movements of the support 17 and consequently the upper part 8 of column 4. The control device 25' is of a construction that will operate the servo-motor 14' to effect such adjusting movements.

In the form of the invention shown in FIG. 4 of the drawings, the flow sample 2 of the liquid 1 in the pipeline 11 is extracted at a speed of approximately 0.1 m/sec. and is led to the top of the first column 30 through a pipe 31 and a pressure reducing valve 32. At the top of column 30 the sample 2 is discharge by the pipe 31 into an annularly shaped overflow or spillway 33 from which the liquid flows out into the upper end of the column. The liquid discharged into column 30 is returned to the pipeline 11 by means of a pipe 34 connected to the lower end of such column and a displacement pump 35. The second column 20 and the diaphragm 22 fitted in the base thereof is hydrostatically associated with column 30 through the entry end of pipe 34.

In this embodiment, the regulating device 25 operable by the float 23 through the lever arrangement 24 is connected to by an electrical connection 26 and controls the opening of a valve 36 mounted in the pipe 31 between the reducing valve 32 and column 30. These means regulate the entry of the sample liquid 2 into the top of column 30 so as to ensure the balance of the float 23, which is to say that diaphragm 22 will be in its natural solid line position which corresponds to a hydrostatic thrust in column 30 that is equal to that of the calibrating column 20. The reading of the height of liquid in column 30 on a level gauge 37 connected to a float 38 will then enable the density of the liquid in this column to be determined in the manner explained with respect to the embodiment of FIG. 1. In both the embodiments of FIGS. 1 and 4, the height of the columns are sufficient to ensure that errors of measurement are of minimal importance.

FIG. 5 of the drawings illustrates a construction which is essentially the same as that shown in FIGS. 1 and 4, but in which the cabibrating column is concentrically located within the column containing the liquid whose density is to be determined. As is shown in FIG. 5, the flow extracted from the pipeline 11 and conducted through a pipe 12 provided with a pressure valve 13, is discharged into the bulbular base of a first column 40. Slidably mounted on the upper end of column 40 is the stem 41 of a tank 42 containing a cylindrically shaped overflow 43 whose interior is in communication with the interiors of the stem 41 and column 40. Thus, the liquid rising in column 40 from pipe 12, passes through the stem 41 into the overflow 43 from which it overspills into the tank 42. The tank 42 is provided with a discharge duct 44 through which the liquid therein is rejected or led back into the pipeline 11. By adjusting the position of the tank 42 relative to the column 40 the height of the overflow 43 may be varied. This adjustment is accomplished by an electric motor 45 provided on its shaft with a pinion 46 which engages and drives a length of chain 47 in one direction or the other. The chain 47 is connected at its ends to the top and bottom walls of the tank 42 to effect vertical movement of the tank 42 and is arranged over guide pulleys 48 and 49 which enable it to produce such operation. A dial gauge 50 associated with the stem 41 of the tank 42 shows the height of the column 40.

The second reference column 51 is fitted within the interior of column 40 so that they are concentrically arranged and with the hemispherical base of column 51 located in the bulbulous base of column 40. As in the previously discussed second columns, column 51 contains a calibrating liquid 52 which rises to a predetermined height corresponding to level N, and such liquid is in contact, pressurewise, with the base of column 40 through a diaphragm 53 fitted in the base of column 51. Also as in the previous embodiment of FIG. 1, an elongated vertically disposed float 54 is steeped in the second column 51, almost to the diaphragm 53, and is connected at its top by a system of levers 24 to a control device 25 which through an electrical connection 26 controls the rotation of motor 45 and the consequent movement of the belt 47 to effect changes in the height of the tank 42 containing the overflow 43. As in the previous embodiments, the float 54 is set in a position of equilibrium, that is to say, it does not cause rotation of motor 45 and the consequent displacement of tank 42, when the diaphragm 53 is in flat condition as is shown in solid lines in FIG. 5. This condition exists when the pressure of the liquid circulating in column 40 acting on one of the surfaces diaphragm 53 is equal to the pressure of the liquid in the calibrating column 51 acting against the other surface of such diaphragm. In other words, the thrust of the two columns is equal.

When however, there is a difference in the pressures exerted by such columns 40, 51 on the surfaces of diaphragm 53, corresponding to a modification in the density of the liquid which circulates in column 40, the shape of diaphragm 53 changes, as shown by the dotted lines, thereby modifying the level in column 51 and causing the float 54 to change its position. The moving float 54 then acts through levers 24 on the regulating device 25 which causes the rotation of motor 45 in a direction such that it will displace tank 42 and overflow 43 in height until the thrust of column 40 is again equal to that of the calibrating column 51 and the diaphragm 53 is again returned to its flat, solid line, condition. At that moment the ratio of the height of the columns is inversely proportional to the densities of the liquids. The height of liquid in column 51, being defined by its level N, and the density of the calibrating liquid which it contains being known, the density of the liquid in column 40 may be determined by measuring the height of column 40 from the horizontal plane passing through diaphragm 53, expressed by level N'. This measurement will be taken from the dial gauge 50.

The embodiment of FIG. 6 is designed to take into account the loss of head arising from the flow into the first column. In the embodiment of FIG. 1, the slight loss of head, due to the flow rate, was disregarded, since it varied with the flow diverted into the first column. In fact, this loss of head is generally insignificant due to the low circulation-speed of the diverted flow. However, in certain cases, particularly for viscous liquids, this loss of head may attain levels incompatible with the required accuracy of measurement. Accordingly, it is contemplated with the construction of FIG. 6, of converting this loss of head due to the flow in the first column into a defineable constant, so that it may be allowed for when correcting measurements.

In the construction shown in FIG. 6, the small flow of liquid such as a hydrocarbon liquid, drawn off from pipeline 11 and passed into pipe 12 through a reducing valve 13, is fed into a cylindrical overflow 43' provided in the upper part of a tank 42' having a stem 41' slidably mounted on the upper part of the first column 40'. Part of the liquid discharged into the overflow 43' by the pipe 12 circulates down column 40' and part of it overspills the overflow 43' and is removed through the duct 44' to be rejected or conducted back to the pipeline 11. As in the embodiment of FIG. 5, the height of the overflow 43' is controlled by an electric motor 45 which displaces tank 42' by means of a chain 47, driven by a pinion 46 on the shaft of motor 45 and guided at 48 and 49 to apply the proper vertical forces to effect such displacement of the tank. A dial gauge 50 shows the height of the liquid in column 40'.

The base of column 40' is connected through a flexible pipe 56 fitted with a tap 57 to a second overflow 58 fitted in the tank 42' a small distance beneath the overflow 43'. Thus, the liquid which circulates down column 40', reascends duct 56 to reach the second overflow 58. There is a constant ($h$) loss of head involved in this circulation which corresponds to the constant difference in the levels of the interlocked overflows 43' and 58 no matter what may be the length of column 40' formed by an adjustment of the unit constituted of the interlocked tank 42' and overflows 43' and 58. The flow, with a small loss of head at constant ($h$), is laminar. It is thus certain that the loss of head in column 40' and duct 56 will remain constant no matter what the design of duct 56 may be, or the variations in the flow.

As in the construction of FIG. 5, the second column 51, erected concentrically in the interior of column 40' and containing the calibrating liquid 52 at a predetermined height corresponding to level N, is in pressure-contact with the base of column 40' through a diaphragm 53 fitted into its base. A float 54 steeped almost to the base of the second column 51, is connected through a system of levers 24 to a control device 25 which, by means of an electrical connection 26, governs the rotation of motor 45 and the consequent movement of belt 47 so that the height of unit 42' may be varied. These parts will function in the manner previously described with respect to the constructions of FIGS. 1 and 5 when there is a difference in pressure on the sides of the diaphragm 53 corresponding to a change in the density of the liquid circulating in column 40' and until the thrust of the liquid in such column is again equal to that of the liquid 52 in the calibrating column 51.

At that precise moment, the ratio of the height in the columns is inversely proportional to the density of the liquids. However, there is a loss of head which is constant in the descending flow of the liquid in column 40' under the effect of load ($H$) and this loss of head causes an increase in the height of the liquid in column 40' which will have to be systematically subtracted from each measurement by means of a corrective function. As the condition of laminar flow in column 40' and duct 56 is known, and the loss of head in them remains constant, the value of this loss of head in column 40' may be determined by closing tap 57 so that the circulation of liquid in column 40' is stopped. The height of the liquid in column 40' in its static condition is then measured. Following this measurement, the tap 57 is opened to restore circulation in column 40' and the height of liquid in this column is again measured. The difference between these two readings will give the corrective function which corresponds to the constant loss of head caused by the flow in column 40' and which must be subtracted from each measurement.

It will be understood from the foregoing, that since the height of liquid in column 51 which is defined by its level N, and the density of the calibrating liquid which such column contains, are known, the density of the liquid in column 40' may be determined by initially reading the dial gauge 50 to obtain the measurement of the height of the liquid in such column from a horizontal plane passing through the diaphragm 53 to the level N' of such liquid, and then deducting from such measurement the corrective expression corresponding to the loss of head due to flow in column 40'. It will also be observed that by diverting the flow from the pipeline 11 into the top of column 40', a pulsing action on the reducing valve 13 and on the diaphragm 53 is avoided, and the movement of float 54 in column 51 is stabilized.

I claim:

1. Apparatus for the measurement of the average density of a liquid circulating in a pipeline comprising a pair of associated substantially vertically disposed columns, means for circulating through one of said columns a given flow of liquid extracted from the pipeline, the other of said columns being fitted at its base with a horizontal diaphragm, the outer face of which is subjected to the pressure of the liquid circulating in said one column, said other column containing a predetermined quantity of a calibrating liquid exerting a certain pressure on the inner face of said diaphragm, means for maintaining the diaphragm in its horizontal position by regulating the height of the liquid in said one column to a level such that the hydrostatic thrusts on both surfaces of said diaphragm are in equilibrium, thereby enabling the average density of the liquid being measured to be deduced from the height of the liquid in said one column, measured from the horizontal position of the diaphragm, said regulating means including means for controlling the quantity of liquid contained in said one column, and means controlled by variations of said diaphragm from a horizontal hydrostatically balanced condition for regulating said controlling means.

2. Apparatus as defined in claim 1, in which said flow circulating means includes liquid conduit means connecting the pipeline to said one column, and in which the outer face of said diaphragm forms part of said conduit means and is exposed to the pressure of the liquid contained in said conduit means.

3. Apparatus as defined in claim 2, in which said liquid conduit means connects the pipeline to the base of said one column.

4. Apparatus as defined in claim 3, in which said flow circulating means includes second conduit means connecting the pipeline to the top of said one column so that the liquid extracted from the pipeline flows downwardly through said one column and into said first mentioned conduit means for return to the pipeline, and in which said regulating means includes means for controlling the quantity of the liquid passing through said second conduit means to the top of said one column.

5. Apparatus as defined in claim 1, in which said flow circulating means includes liquid conduit means connecting the pipeline to the top of said one column so that the liquid extracted from the pipeline flows downwardly through said one column.

6. Apparatus as defined in claim 5, in which said means for regulating the height of the liquid in said one column includes means for controlling the quantity of liquid supplied to the top of said one column by said liquid conduit means.

7. Apparatus as defined in claim 6, in which said one column is provided at its upper end with an overflow into which is discharged the liquid supplied by said liquid conduit means.

8. Apparatus as defined in claim 1, in which the top of said one column is constituted at its upper part of a vertically movable overflow enabling a portion at least of the liquid supplied to said one column to overspill, for removal from said one column, and in which said regulating means includes means for adjusting the height of said overflow to bring the hydrostatic thrust of said one column into equality with that of said other column.

9. Apparatus as defined in claim 8, in which said overflow forms a fixed part of said one column and said one column is vertically movable by said adjusting means to effect the vertical movement of said overflow.

10. An apparatus as defined in claim 8, in which said overflow is constituted of a tubular receptacle mounted on the upper end portion of said one column, said upper end portion being connected to and movable by said adjusting means.

11. Apparatus as defined in claim 10, in which said upper end portion of said one column is connected to the remainder of said one column for vertical movement relative thereto.

12. Apparatus as defined in claim 11, in which said upper end portion of said one column is slidably mounted in substantially liquid-tight relation to the remainder of said one column, and in which said regulating means comprises a motor unit and means connecting said motor unit to said upper end portion to effect sliding adjusting movement of the latter to vary the height of said overflow.

13. Apparatus as defined in claim 10, in which said overflow is enclosed in a tank associated with said upper end portion of said one column and having a discharge outlet for the overspill of said overflow.

14. Apparatus as defined in claim 13, including a second overflow constituted of a tubular receptacle mounted in said tank in given spaced relation below said first mentioned overflow, the difference in level between the two overflows representing the flow head of the liquid in said one column, a conduit connecting the base of said one column to said second overflow, and means for controlling the flow of liquid from said one column base to said second overflow.

15. Apparatus as defined in claim 14, in which said overflows and said tank are connected together in interlocked relation so that said flow head remains constant during the adjustment of the height of said first mentioned overflow.

16. Apparatus as defined in claim 8, including a second overflow associated with and positioned in given interlocked spaced relation below said first mentioned overflow, the difference in level between the two overflows representing the flow head of the liquid in said one column and remaining constant during the adjusting movements of said first overflow, a conduit means connecting said second over-flow to the base of said one column, and means for controlling the flow of liquid through said conduit means.

17. Apparatus as defined in claim 1, in which said controlled means includes an elongated float extending downwardly through the calibrating liquid almost to the base of said other column, and means connected to said float and operable by the latter to regulate said controlling means.

18. Apparatus as defined in claim 17, in which said other column is located within and concentrically arranged relative to said one column, and in which said one column has an enlarged base, and said other column has an enlarged base located within the enlarged base of said one column, the bottom wall of said other column enlarged base being composed of said horizontal diaphragm, and said elongated float extending down into the enlarged base of said other column to a point short of said horizontal diaphragm.

* * * * *